(12) United States Patent
Hove et al.

(10) Patent No.: US 7,568,018 B1
(45) Date of Patent: Jul. 28, 2009

(54) DYNAMIC IDENTIFICATION AND ADMINISTRATION OF NETWORKED CLIENTS

(75) Inventors: James B. Hove, St. Paul, MN (US); Emily J. D. Harris, Minneapolis, MN (US); David A. Pickett, Bloomington, MN (US)

(73) Assignee: New Boundary Technologies Inc., Minneapolis, MN (US)

( * ) Notice: Subject to any disclaimer, the term of this patent is extended or adjusted under 35 U.S.C. 154(b) by 917 days.

(21) Appl. No.: 10/805,173

(22) Filed: Mar. 19, 2004

(51) Int. Cl.
*G06F 15/177* (2006.01)
*G06F 15/16* (2006.01)
*G06F 15/173* (2006.01)
*G06F 1/24* (2006.01)
*G06F 9/44* (2006.01)
*G06F 17/30* (2006.01)
G06F 9/00 (2006.01)
G06F 9/24 (2006.01)
G06F 9/445 (2006.01)
G06F 3/00 (2006.01)
G06F 7/00 (2006.01)
G06F 12/00 (2006.01)
G06F 17/00 (2006.01)

(52) U.S. Cl. .......... 709/221; 709/223; 709/224; 709/248; 713/100; 717/169; 717/172; 717/177; 715/735; 715/736; 715/748; 715/749; 707/203

(58) Field of Classification Search .......... 709/203, 709/220–224, 248, 249; 713/1, 2, 100; 717/168–178; 715/734–736, 748, 749; 707/10, 104.1, 203
See application file for complete search history.

(56) References Cited

U.S. PATENT DOCUMENTS 6,115,549 A 9/2000 Janis et al. .......... 717/172

(Continued)

OTHER PUBLICATIONS

Burgess, Mark. "Theoretical System Administration," Proceedings of the 14th USENIX Conference on System Administration, 2000, pp. 1-14.*

(Continued)

*Primary Examiner*—Larry D Donaghue
*Assistant Examiner*—Melvin H Pollack
(74) *Attorney, Agent, or Firm*—Schwegman, Lundberg & Woessner, P.A.

(57) ABSTRACT

The present inventive subject matter relates to networked computing environments and more specifically to dynamic identification and administration of networked clients. Various embodiments of the present inventive subject matter include systems and methods for defining, on a server, a configuration of interest comprising one or more potential properties of a client, communicating the configurations of interest over a network to one or more clients, dynamically evaluating a client state relative to the configurations of interest, and communicating a representation of the client state in relation to the configuration of interest to the server. Further embodiments include automatically creating and displaying associations of clients based on configurations of interest. Yet further embodiments include clients requesting and receiving updates to the configurations of interest. Still further embodiments include actions associated with configurations of interest. Such actions, in various embodiments, include performing administrative actions on various networked clients.

15 Claims, 10 Drawing Sheets

U.S. PATENT DOCUMENTS

| | | | |
|---|---|---|---|
| 6,412,026 B1 * | 6/2002 | Graf .............................. 710/18 |
| 6,477,572 B1 * | 11/2002 | Elderton et al. ............. 709/224 |
| 6,493,594 B1 | 12/2002 | Kraml |
| 6,510,420 B1 | 1/2003 | Cessna et al. |
| 6,529,784 B1 | 3/2003 | Cantos et al. ................. 700/79 |
| 6,546,424 B1 * | 4/2003 | Cucchiara ................... 709/226 |
| 6,549,943 B1 * | 4/2003 | Spring ........................ 709/223 |
| 6,587,876 B1 | 7/2003 | Mahon et al. ............... 709/223 |
| 6,664,978 B1 * | 12/2003 | Kekic et al. ................. 715/733 |
| 6,678,888 B1 | 1/2004 | Sakanishi .................... 717/172 |
| 6,694,362 B1 * | 2/2004 | Secor et al. ................. 709/223 |
| 6,754,703 B1 * | 6/2004 | Spring ........................ 709/223 |
| 6,766,368 B1 * | 7/2004 | Jakobson et al. ............ 709/224 |
| 6,788,315 B1 * | 9/2004 | Kekic et al. ................. 715/733 |
| 6,795,868 B1 * | 9/2004 | Dingman et al. ............ 709/246 |
| 6,836,803 B1 * | 12/2004 | Swartz et al. ............... 709/227 |
| 6,880,086 B2 * | 4/2005 | Kidder et al. ............... 713/191 |
| 6,904,454 B2 * | 6/2005 | Stickler ....................... 709/213 |
| 6,986,133 B2 * | 1/2006 | O'Brien et al. ............. 717/173 |
| 6,993,759 B2 * | 1/2006 | Aptus et al. ................. 717/170 |
| 7,020,706 B2 * | 3/2006 | Cates et al. ................. 709/229 |
| 7,093,005 B2 * | 8/2006 | Patterson .................... 709/220 |
| 7,225,244 B2 * | 5/2007 | Reynolds et al. ............ 709/223 |
| 7,266,595 B1 * | 9/2007 | Black et al. ................. 709/223 |
| 7,299,277 B1 * | 11/2007 | Moran et al. ................ 709/224 |
| 7,313,564 B2 * | 12/2007 | Melamed et al. ............ 707/101 |
| 7,337,191 B2 * | 2/2008 | Haeberle et al. .......... 707/104.1 |
| 7,349,913 B2 * | 3/2008 | Clark et al. ................. 707/101 |
| 7,349,960 B1 * | 3/2008 | Pothier et al. ............... 709/224 |
| 7,363,359 B1 * | 4/2008 | Tripathy et al. ............. 709/223 |
| 2003/0009552 A1 * | 1/2003 | Benfield et al. ............. 709/224 |
| 2003/0163807 A1 | 8/2003 | Drake et al. |
| 2003/0195951 A1 | 10/2003 | Wittel, Jr. et al. ........... 709/220 |
| 2003/0212767 A1 | 11/2003 | Yang-Huffman |
| 2004/0015571 A1 | 1/2004 | Miyazaki et al. |
| 2004/0133689 A1 * | 7/2004 | Vasisht ....................... 709/228 |
| 2004/0148288 A1 * | 7/2004 | Haeberle et al. ............... 707/10 |
| 2005/0027845 A1 * | 2/2005 | Secor et al. ................. 709/223 |
| 2005/0120105 A1 * | 6/2005 | Popescu et al. ............. 709/223 |
| 2005/0138164 A1 * | 6/2005 | Burton et al. ............... 709/224 |
| 2005/0193103 A1 * | 9/2005 | Drabik ....................... 709/221 |
| 2005/0210459 A1 * | 9/2005 | Henderson et al. .......... 717/168 |
| 2005/0249169 A1 * | 11/2005 | Fong .......................... 370/338 |

OTHER PUBLICATIONS

Anderson, Eric et al. "A System Diagnostic Console for Networks of Computers," 10th System Administration Conference (LISA), 1996, pp. 1-3.* de Franceschi, A.S.M. et al. "Proactive Network Management Using Remote Monitoring and Artificial Intelligence Techniques,"0 Second IEEE Symposium on Computers and Communications, 1-3 Jul. 1997, pp. 167-171.*

Astithas, Panagiotis et al. "Integrating Intrusion Detection and Network Management," Proceedings of the 6th HP OpenView University Association, 1999, pp. 1-5.*

* cited by examiner

DYNAMIC IDENTIFICATION AND ADMINISTRATION OF NETWORKED CLIENTS

FIELD OF THE INVENTION

The present inventive subject matter relates to networked computing environments and more specifically to dynamic identification and administration of networked clients.

BACKGROUND OF THE INVENTION

The challenges of remotely administering networked devices are twofold. First, there must exist a means of remotely carrying out an action at a networked device. Second, and no less importantly, there must exist a means of identifying at which networked devices the action is to be carried out. This second challenge has traditionally been met with purely manual steps on the part of the person performing the administration. For instance, an administrator might add a device to a group of devices where a specific administrative action is to be carried out.

Often the actions that are to be carried out on a networked device are not associated with the device's identity or name, but rather with its properties, or configuration. For instance, the administrator of a networked device may want the ability to take a certain action on all devices that have a certain software application, hard-disk configuration, CPU manufacturer, network configuration, disk-space situation, memory configuration, etc.

Various methods exist for collecting and tracking this configuration information. Some methods of identifying devices and device configurations include sending out an inventory or asset query. Such queries go out to every device and collect hardware, software, and other configuration settings. This data is subsequently reported back to a central database where the administrator can run various reports on the data to understand the state of the devices. Such a query is valid for that point in time only. As soon as a single device configuration changes, the query is no longer valid. Further, because the configuration data is harvested centrally in one step and then queried as a second step, these methods do not allow administrators to perform actions on devices based on their exact configuration at the point the action is to be carried out.

Another method of identifying devices and device configurations has been on the basis of specific software applications or patches. Under such a method, the software application or patch installation includes a means for identifying the devices to which the application or patch applies. For instance, a company that publishes anti-virus software might provide customers with an automated means of identifying the computers that are not guarded against the latest viruses so that this security lapse can automatically be corrected. Such approaches are limited to the configurations and actions that apply to the installation or patch. They are thus insufficient for the many diverse actions administrators potentially need to carry out on networked devices.

Thus, there is a need for systems and methods to assist administrators in performing many diverse actions on networked devices.

SUMMARY

The present inventive subject matter relates to networked computing environments and more specifically to dynamic identification and administration of networked clients. Various embodiments of the present inventive subject matter include systems and methods for defining, on a server, a configuration of interest comprising one or more potential properties of a client, communicating the configurations of interest over a network to one or more clients, dynamically evaluating a client state relative to the configurations of interest, and communicating a representation of the client state in relation to the configuration of interest to the server. Further embodiments include automatically creating and displaying associations of clients based on configurations of interest. Yet further embodiments include clients requesting and receiving updates to the configurations of interest. Still further embodiments include actions associated with configurations of interest. Such actions, in various embodiments, include performing administrative actions on various networked clients.

DETAILED DESCRIPTION

In the following detailed description, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

Figure 1:
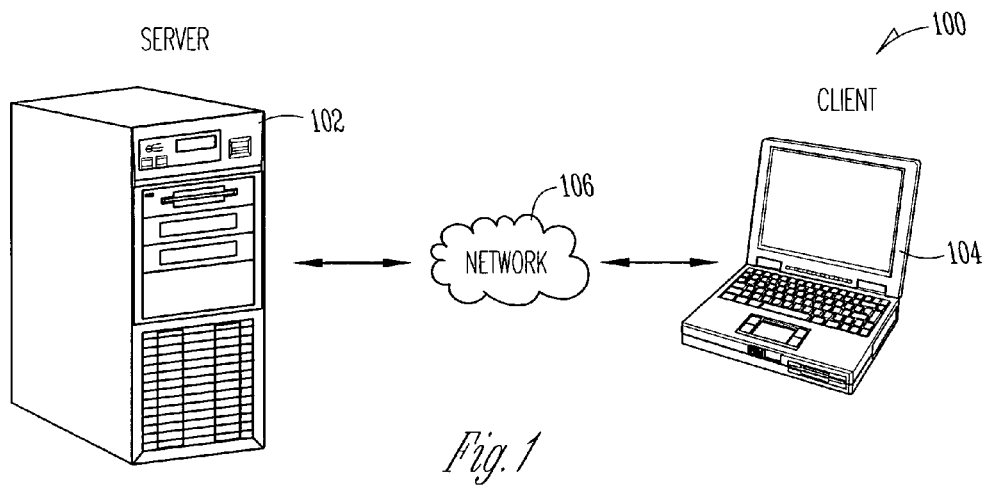
FIG. 1 is a block diagram of an example hardware and operating environment according to one embodiment of the invention.

Hardware and Operating Environment. FIG. 1 is a block diagram of an example hardware and operating environment according to one embodiment of the present inventive subject matter. This embodiment shows a system 100 including a server 102, a client 104 and a network 106. The client 104 and the server 102 are operable in concert across the network 106.

The server 102 is any type of electronic device that provides some service to or carries out or causes some action on the client 104. In some embodiments the server 102 includes a processor, a memory, a network interface, and software in the memory that is operable on the processor to cause the server 102 to perform various operations for remotely administrating a networked device as discussed below. In other embodiments, the hardware components of the server 102 vary according to the specific implementation of the system 100. The server 102 is not limited to any particular operating system. In some example embodiments, the server 102 is a Windows based server 102, while in other embodiments the server is a Unix or Linux based server. Other embodiments include servers with still other operating systems.

The client 104 is any type of electronic device that receives the services or actions from the server 102. In some embodiments the client 104 includes a processor, a memory, a network interface, and software in the memory that is operable on the processor to cause the client 104 to perform various operations as discussed below. In other embodiments, the hardware components of the client 104 vary according to the specific implementation of the system 100 and according to the specific type of device of the client 104. The client is not limited to any particular operating system. In some embodiments, the client is a Windows based client personal computer (PC), while in other embodiments, the client is a Macintosh, Linux, Unix, Palm, or other client operating system based device. Still other embodiments include client devices with still other operating systems. Example client devices include, but are not limited to, PCs, laptops, handheld computing devices, printers, servers, multifunction devices such as copier/printer/scanner devices, configurable routers and switches, and virtually any other electronic device capable of communicating over the network 106.

The network 106 is not limited to any particular type of network. Some embodiments of the present inventive subject matter include wired networks, such as Ethernet, gigabit Ethernet, and other wired-type networks. Further embodiments of the network 106 include wireless networks such as an I.E.E.E. 802.11a/b/g compliant network or other similar wireless networking technologies. Yet further embodiments include a network 106 having wired and wireless elements. In various embodiments, the network 106 is a local area network (LAN), a wide area network (WAN), a hybrid LAN/WAN network, or some other similar network type. In some such embodiments, the network 106 is augmented to include an Internet connection. In some embodiments including an Internet connection, the network 106 further includes a virtual private network (VPN) connecting remote client 104 devices.

In some embodiments the system 100 includes many client devices such as client device 104 and the network 106 is very large, both physically and geographically. Thus, administrators of the system 100 are faced with the problem of performing administrative tasks on such client devices that are on large and geographically distributed networks.

Figure 2:
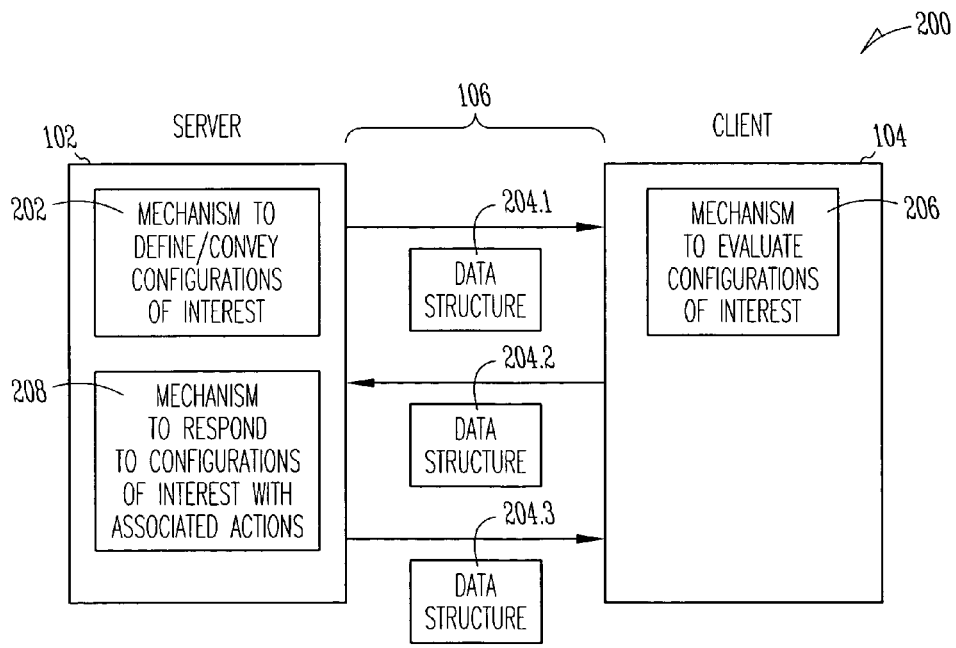
FIG. 2 is a high-level block diagram of an example system for remote administration of network clients.

System Overview. FIG. 2 is a high-level block diagram of an example system 200 for remote administration of network clients. In one embodiment, the system 200 comprises a mechanism to define and convey configurations of interest 202, a mechanism to evaluate configurations of interest 206 and a mechanism to respond to configurations of interest with associated actions 208.

A configuration of interest is used by system 200 for many diverse purposes associated with administering a networked client 104 including monitoring and maintaining the client 104. A configuration of interest includes a definition of a state of a client computer based on certain properties the client may have. A property as used herein refers to a characteristic of the client computer. In various embodiments, these properties include hardware components, software components, hardware or software configurations parameters, a client type (i.e., router, server, printer, PC, etc.), and any other similar type of property of a client 104. Examples of hardware component properties include but are not limited to processor family, processor speed, processor manufacturer, number of processors, amount of installed memory, available disk space, types and properties of installed peripheral devices (i.e., graphics cards, network interface cards (NIC), and sound cards), and so on. Examples of software component properties include but are not limited to operating system type, a version indicator of a certain software program or component, and so on. Examples of software configuration parameters include but are not limited to security settings, time zone settings, language settings, operating system roles (i.e., server, workstation, or domain controller), user domain, and so on.

In one embodiment, the mechanism to define and convey configurations of interest 202 is software running on a server such as server 102. The mechanism to define and convey configurations of interest 202 allows a system administrator to identify the clients that they want to carry out an action on without having to know the machine name of the client or the IP address of the client or even the total number of clients the action will be carried out on. The system administrator identifies the clients that they want to carry out an action on by specifying one or more properties of the target clients. For example, if the system administrator wants to perform administrative actions on all computers having the system language set to "French," then the system administrator would define a configuration of interest using a single property (i.e. the operating system language setting). In more complex examples, configuration of interest is defined by a combination of properties as will be described in more detail later. In one embodiment, a system administrator uses a wizard to create a unique configuration of interest by combining one or more property identifiers into logical statements. In another embodiment, a system administrator is able to define a configuration of interest using any available script or programming language. In one embodiment, defining a configuration of interest also includes associating one or more actions with the configuration of interest. The implementation of the actions is managed by the mechanism to respond to configurations of interest with associated actions 208 as described in more detail below. After the configuration of interest is defined, the mechanism to define and convey configurations of interest 202 conveys the configuration of interest to the clients.

In one embodiment, the mechanism to evaluate configurations of interest 206 is software running on a client such as client 104. This mechanism to evaluate configurations of interest 206 receives conveyed configurations of interest from the mechanism to define and convey configurations of interest 202 on the server 102 and dynamically evaluates properties on the client 104 relative to the configurations of interest. The mechanism to evaluate configurations of interest 206 also retains the configurations of interest for re-evaluation. In some embodiments, the mechanism to evaluate configurations of interest 206 also receives updates to existing configurations of interest that it has retained. In some embodiments, the evaluation of properties by the client occurs upon receipt of a new configuration of interest. In alternate embodiments, properties are dynamically evaluated for configurations of interest that persist on the client 104. As used herein, dynamically means continually evaluating client properties in relation to configurations of interest. This continuous evaluation in various embodiments is an iterative evaluation so as to restart upon completion of an evaluation or to restart the evaluation of client properties after a certain period of time. At the same time, this dynamic evaluation may be subject to prioritizing processes on certain clients in some embodiments that delays the continuous evaluation. However, these prioritizing processes in such embodiments are not considered to prevent the continuous evaluation from being dynamic.

After the client completes an evaluation, the mechanism to evaluate configurations of interest 206 on the client communicates information about the properties back to the server 102. In the example with the configuration of interest having a single property to determine if the current operating system language setting is "French," the client dynamically evaluates its current operating system language setting to determine the current client property in regard to the distributed configuration of interest. The client responds to the server with the results of the evaluation.

In one embodiment, the mechanism to respond to configurations of interest with associated actions 208 is software running on a server such as server 102. This mechanism to respond to configurations of interest 208 receives the information from a client about the properties evaluated by the client in relation to the configurations of interest. The mechanism 208 evaluates the received client information to determine if any actions need to be performed based on one or more actions associated with the configurations of interest. In some embodiments, the actions are actions performed on the client such as installing or deleting software. If the mechanism determines one or more actions need to be performed on the client, the mechanism communicates with the client to cause the needed actions to occur on the client. In other embodiments, the actions are performed on the server such as adding the client to a group of computers that are identified with certain properties. In the example with the configuration of interest to determine the current operating system language, if the information received from the client indicates that the client has the "French" language, then the server will determine what action is to be performed for clients having the "French" language and carry out that action. As just one example, the action to be carried out may be to perform an operating system update on that client.

One example embodiment of the operation of system 200 follows. The mechanism to define and convey 202 on the server 102 conveys a data structure 204.1 including data representative of a configuration of interest to a mechanism 206 on the client 104. The mechanism to evaluate 206 evaluates the current client 104 configuration state based on the configuration of interest received from the server 102. The client 104 mechanism then communicates a data structure 204.2 back to the server 102. The data structure 204.2 includes data indicative of the current client 104 configuration state in relation to the configuration of interest. The mechanism 208 on the server 102 responds to received client 104 configuration state data by carrying out the associated actions. Actions associated with a configuration of interest are either triggered on a client 104 or on the server 102. These associated actions are triggered on a client as a response to the received client 104 configuration state data to modify the client's 104 current configuration state. In various embodiments, these actions include one or more actions. In some such embodiments, these actions include installing software, uninstalling software, modifying configuration settings, for example, by changing a Windows registry setting, copying files to the client 104, deleting files from the client 104, or other types of administrative actions. The various actions that the client 104 is to perform are communicated to the client 104 from the server 102 over the network 106 in a data structure 204.3.

Unlike previous methods of sending out an inventory or asset query that require large volumes of data to be reported back to a server, embodiments of the present invention substantially reduce the amount of data to be provided to the server by the client. According to embodiments of the present invention, the client only provides to the server an indication of its state relative to a configuration of interest rather than providing the values of properties defined by the configuration of interest. In the examples shown in FIG. 2, the data structure 204.2 conveys this state information. Thus, embodiments of the invention reduce the amount of data to be sent to and stored on a server.

Figure 3:
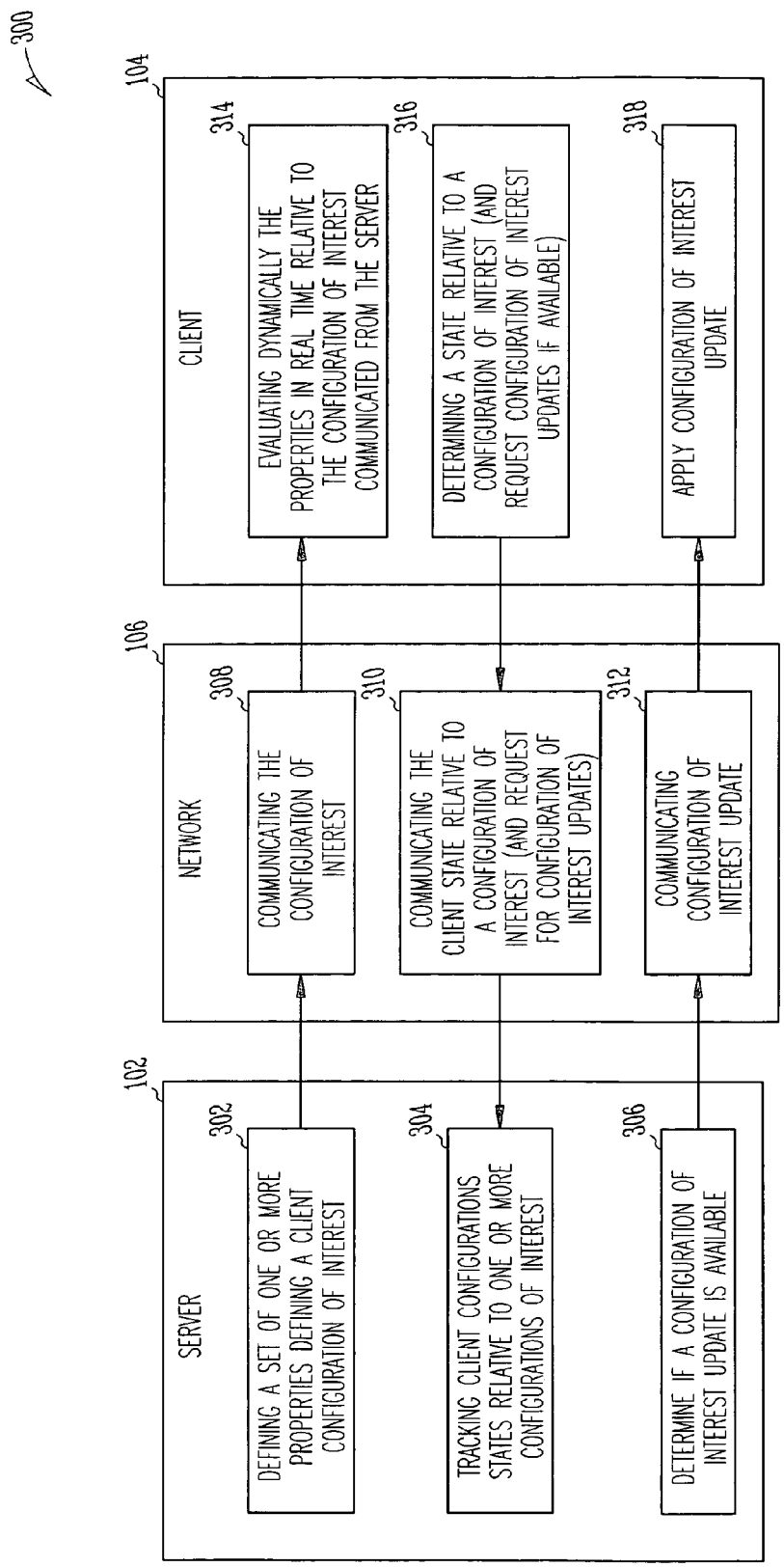
FIG. 3 is a functional block diagram of the example system of FIG. 2 according to one embodiment of the invention.

FIG. 3 is a functional block diagram of one embodiment of an example system 300. This illustration is an example embodiment of how a system 300 operates to dynamically monitor client states in relation to a configuration of interest, notify the server of changes, and update client state information tracked by the server.

This embodiment of system 300 includes a server 102, a client 104, and a network 106. The system 300 is operable to perform functions to allow system 300 wide administrative capabilities. Server 102 is operable for defining a set of one or more client properties for a client 104 configuration of interest. That client 104 configuration of interest is communicated 308 over the network 106 to the clients 104 on the network. The client 104 then dynamically evaluates 314 the client's 104 properties relative to the configuration of interest. The client 104 then determines 316 its state relative to the received configuration of interest. The determined 316 client 104 state relative to the configuration of interest is next communicated 310 to the server 102. In some alternate embodiments, the client 104 further requests 316 configuration of interest updates from the server 102 over the network 106. In various embodiments, the server 102 tracks 304 client configuration states relative to one or more configurations of interest defined on the server 102. The server 102 then determines 306 if a configuration of interest update is available for the client 104 updating its client 102 state or requesting 316 configuration of interest updates. If an update is available, the update is communicated 312 over the network 106. The client 104 receives and applies 318 the update. Once the update has been applied the client reevaluates 314 itself relative to the updated client 104 configuration. The client 104 further reevaluates itself after determining 316 and communicating 310 its state relative to its current configuration of interest. Thus, the embodiments of the system 300 shown in FIG. 3 dynamically reevaluate the state of the client 104 relative to a configuration of interest. The client further dynamically communicates a state change to the server (i.e., upon detection of a modification to the client state relative to a configuration of interest).

Unlike previous methods in which the data received from inventory or asset queries is valid only for that particular point in time, embodiments of the present invention are capable of dynamically reevaluating a configuration of interest relative to a particular client's state and communicating any state changes back to the server without a new query. Thus, embodiments of the present invention also allow a server to maintain up-to-date information about the configurations of individual network devices even if the configuration of one of the devices changes over time.

Figure 4:
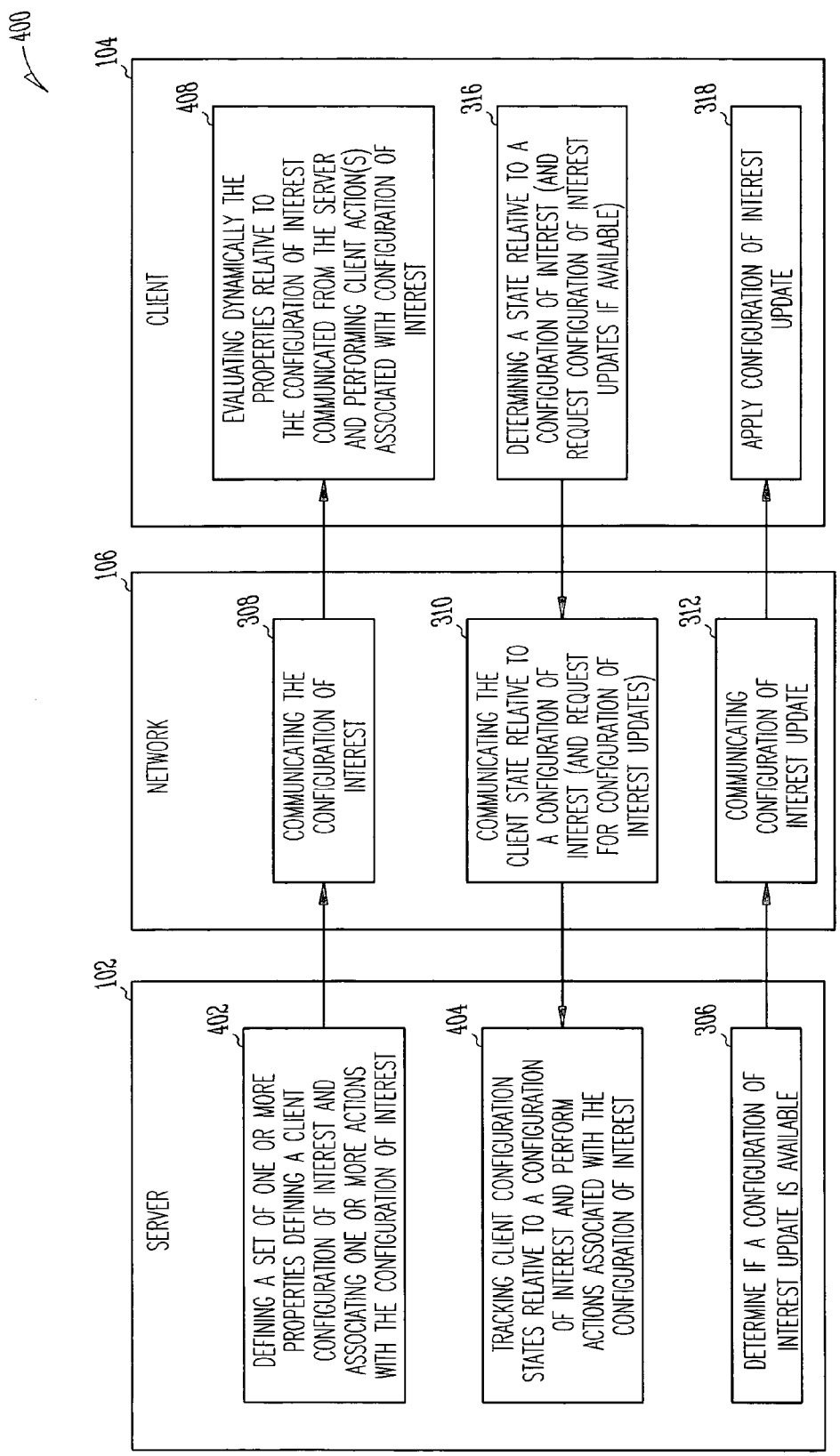
FIG. 4 is a functional block diagram of an alternate embodiment example of the system of FIG. 2 according to one embodiment of the invention.

FIG. 4 is a functional block diagram of an alternate system 400 embodiment of the system 300. The system 400 illustration of FIG. 4 differs from the system illustration of FIG. 3 by actions associated with a configuration of interest. These actions are to be performed on the client 104. These actions include various administrative functions such as updating client configurations by installing or uninstalling various software and software upgrades. Further, these actions include performing tasks such as automatically creating associations of client devices with similar or identical properties. Additionally, these actions include creating lists for administrators or technicians to manually perform upgrades, downgrades, or maintenance to various client devices. Such lists are useful in creating lists of computers that need upgrades such as to memory.

System 400 shown in FIG. 4 includes defining 402 a set of one or more properties for a client 104 configuration of interest and associating one or more actions with the configuration of interest. The server 102 can include one or more defined configurations of interest, some such configurations of interest with one or more associated actions. These configurations of interest are then communicated 308 to various clients 104 on the network 106.

In some embodiments, all configurations of interest are communicated 308 to all clients 104, while in other embodiments, only certain configurations of interest are communicated to certain clients. As a first example in a global corporation, certain language specific configurations of interest are only distributed to target clients in certain geographic regions where the corporation has offices. As a second example, where the implementation and the target clients are the same as the first example, a configuration of interest with a language identifier specified is distributed to all clients without regard to geographic region, but only applies to target clients with the specified language identifier. The results of these two examples are the same. However, the second example is advantageous in situations where the administrator does not have prior knowledge of geographic locations of the target clients.

Once a client 104 in this embodiment of the system 400 receives a configuration of interest, the client 104 dynamically evaluates 408 its properties relative to each configuration of interest on the client 104 and performs actions associated with the configuration of interest triggered by the client state relative to the configuration of interest. The client then determines 316 a state relative to a configuration of interest and communicates 310 that state to the server. The client 104 further requests 316 configuration of interest updates from the server 102 over the network 106.

In some embodiments, the server 102 then tracks 404 client 104 configuration states relative to one or more configurations of interest and performs server 102 side tasks associated with each of the one or more configurations of interest. Such tasks in various embodiments include sending a list of associated actions by the server 102 to a client 104 or elsewhere on the network 106.

In some further embodiments, the server 102 determines 306 if a configuration of interest update is available for the client 102 updating its client state or requesting 316 configuration of interest updates. If an update is available, the update is communicated 312 over the network 106. The client 104 receives and applies 318 the update. Once the update has been applied the client reevaluates its state relative to the updated client 104 configuration. The client 104 further reevaluates its state after determining 316 and communicating 310 its state relative to its current configuration of interest. Thus, the embodiments of the system 400 shown in FIG. 4 dynamically reevaluates the state of the client 104 relative to one or more a configurations of interest. The client 104 further dynamically communicates state changes to the server 102 (i.e., upon detection of a modification to the client state relative to one or more configurations of interest).

Figure 5:
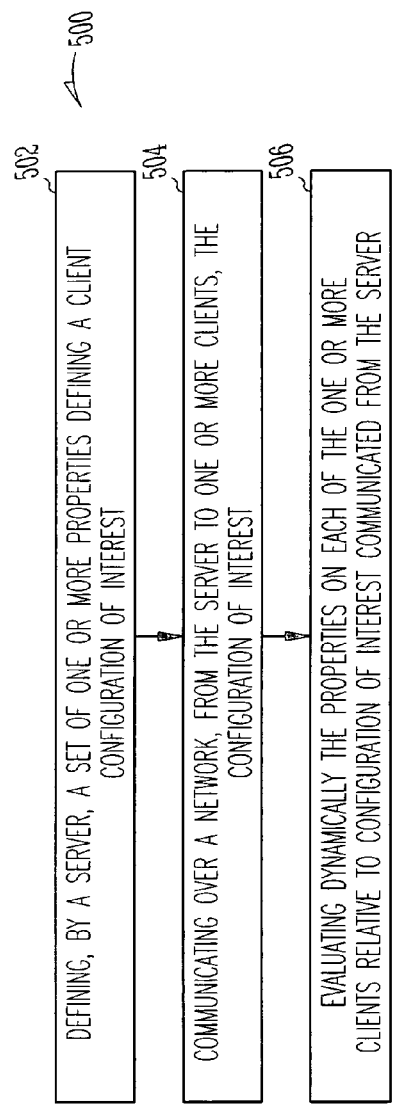
FIG. 5 is a flow chart of a method according to one embodiment of the invention.

Methods. FIG. 5 is a flow chart of a method 500 according to one embodiment of the present inventive subject matter. Method 500 includes defining 502, by a server, a set of one or more properties defining a client configuration of interest. As mentioned previously, such properties include properties of a client computer such as a processor type, processor manufacturer, amount of RAM, software properties such as program version or operating system type, operating system language setting, operating system role (i.e., server, workstation, domain controller, etc.) time zone setting, client computer domain, or various other client properties. The method 500 further includes communicating 504 over a network, from the server to one or more clients, the configuration of interest. The method 500 also includes dynamically evaluating 506 the properties on each of the one or more clients relative to the configuration of interest communicated from the server.

In various embodiments, the method 500 is implemented on servers and clients by installing a piece of software for execution on the server or client in carrying out the method 500. In some such embodiments, the software is encoded on a machine readable medium such as a compact disk. In another embodiment, the software is downloadable to a server or client over a network connecting the clients and the servers. In one such embodiment, the software is downloadable from an Internet site accessible over an Internet connection available on the network connecting the clients and the servers.

In some embodiments, the method 500 includes communicating 504 certain configurations of interest only to certain clients in certain departments in a corporation. In other embodiments, the configurations of interest are communicated to all clients on a network, but might apply only to client in certain departments based on the configuration of interest and its applicability to that certain department. The clients receiving the configurations of interest dynamically evaluate 506 their properties for modifications relative to the configurations of interest. Upon detection of a modification, the clients communicate that modification to the server.

In various embodiments of the method 500, the method is useful in administering a network of client computers. In some embodiments, the software referenced above for implementing the method 500 further includes instructions for causing each client to report a state relative to each individual configuration of interest to the server. In such embodiments, the server software includes instructions for causing the server to automatically create and maintain associations of client computers based on the client states. Clients then continue to monitor their properties relative to individual configurations of interest and report any state changes to the server. Administrators can then view virtually current network and client status reports. This significantly enhances the manageability of clients and networks in small, as well as large-scale, geographically dispersed computing environments.

Figure 6:
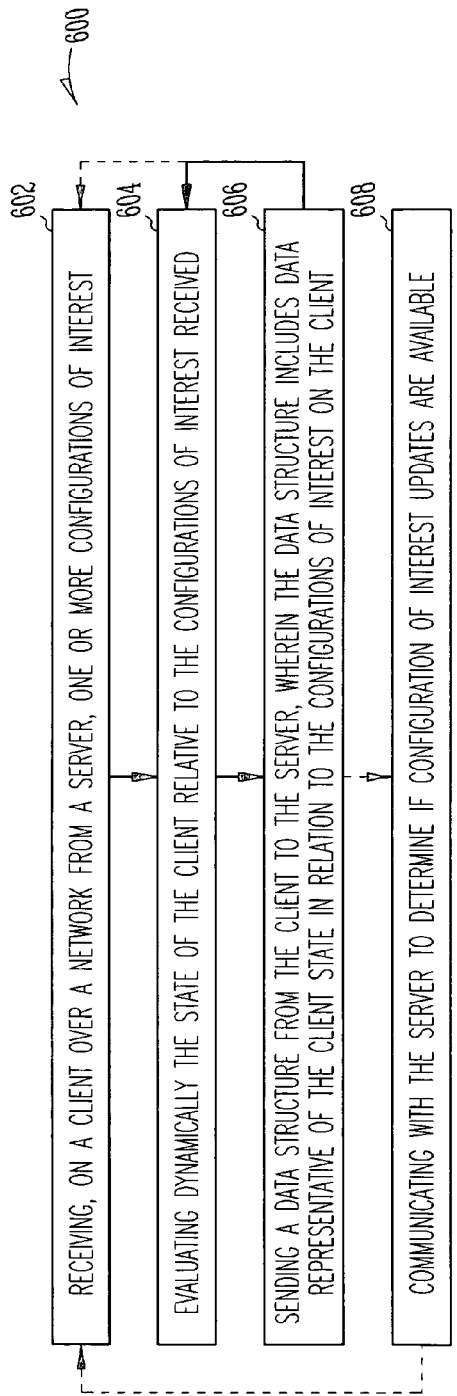
FIG. 6 is a flow chart of a method according to another embodiment of the invention.

FIG. 6 is a flow chart according to another embodiment of a method 600 according to the present inventive subject matter. This method 600 embodiment includes receiving 602, on a client over a network from a server, one or more configurations of interest and dynamically evaluating 604 the state of the client relative to the configurations of interest received. Various embodiments of the present method 600 further include sending 606 a data structure from the client to the server, wherein the data structure includes data representative of the client's state in relation to the configurations of interest on the client. In some such embodiments, sending 606 the data structure from the client to the server further includes communicating 608 with the server to determine if configuration of interest updates are available. The method 600 continues in an iterative fashion either receiving 602 an update to a configuration of interest and evaluating 604 the client in accordance therewith, or continually evaluating 604 and sending 606 a data structure to the server upon detection of a change to a property that results in the client's state relative to a configuration of interest changing.

In some embodiments, the data structure that includes data representative of client properties is a two dimensional array having a row for each property and columns for the property and for the value of that property. In some other embodiments, the properties of the client are encoded in a markup language such as eXtensible Markup Language (XML) for communication from the client to the server. In yet further embodiments, the clients receive configurations of interest in a markup language such as XML. In some such embodiments of clients and servers exchanging properties and configurations of interest, the communications are encrypted using various encryption levels and methodologies. One such embodiment utilizes public key infrastructure (PKI) technology for exchanging configurations of interest and client properties in relation to the configuration of interest across the Internet.

Figure 7:
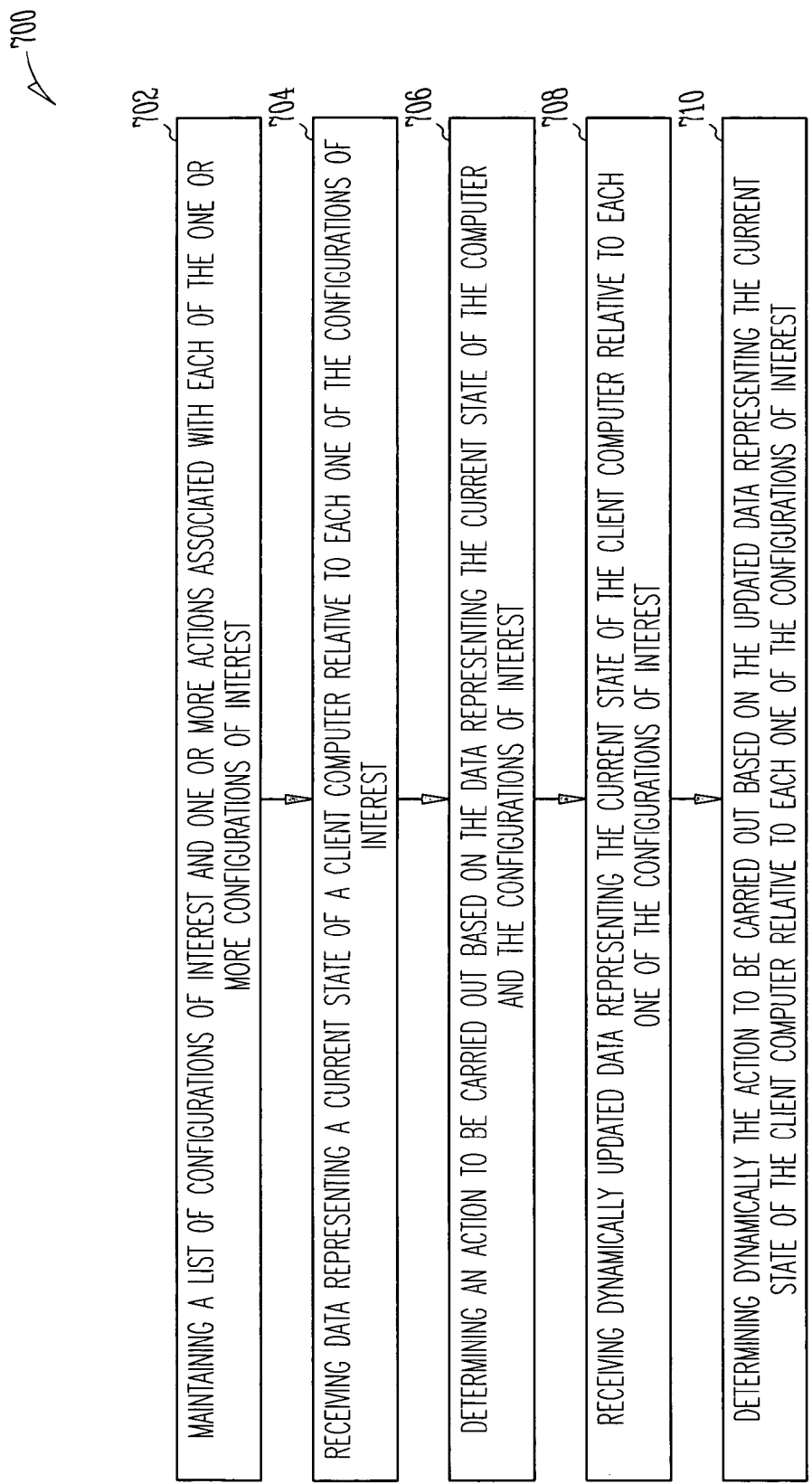
FIG. 7 is a flow chart of a method according to an alternate embodiment of the invention.

FIG. 7 is a flow chart of another method 700 according to one embodiment of the invention when implemented on a server. The method 700 includes maintaining 702 a list of configurations of interest and one or more actions associated with each of the one or more configurations of interest. Some such embodiments of the method 700 further comprise receiving 704 data representing a current state of a client computer relative to each one of the configurations of interest, determining 706 an action to be carried out based on the data representing the current state of the computer and the configurations of interest, and receiving 708 dynamically updated data representing the current state of the client computer relative to each one of the configurations of interest. Further embodiments also include dynamically determining 710 the actions to be carried out based on the updated data representing the current state of the client computer relative to each one of the configurations of interest.

In some embodiments of the method 700 illustrated in FIG. 7, the actions associated with a configuration of interest are actions to be performed on a client device. In some embodiments, the actions include installing software. In other embodiments, the actions include updating software such as a client operating system, executing a routine or software program on the client for maintaining the client such as defragmenting a hard drive on a client device, or a routine for causing the client to provide, or refresh, a list of all of a client's properties to the server.

Some further embodiments of the method 700 further include displaying a graphical representation of current client states relative to the defined configurations of interest. In some embodiments, the graphical representation is in a tree view structure that is selectively expandable and contractible. In other embodiments, the display is in an outline format displayed on a computer monitor or printable on paper.

Yet further embodiments of the method 700 include storing received data from clients representing the current state of the client computers. In some embodiments, the data is stored for historical purposes. In other embodiments, the data is stored as a backup of a networked computing environment state at a particular point in time.

Figure 8:
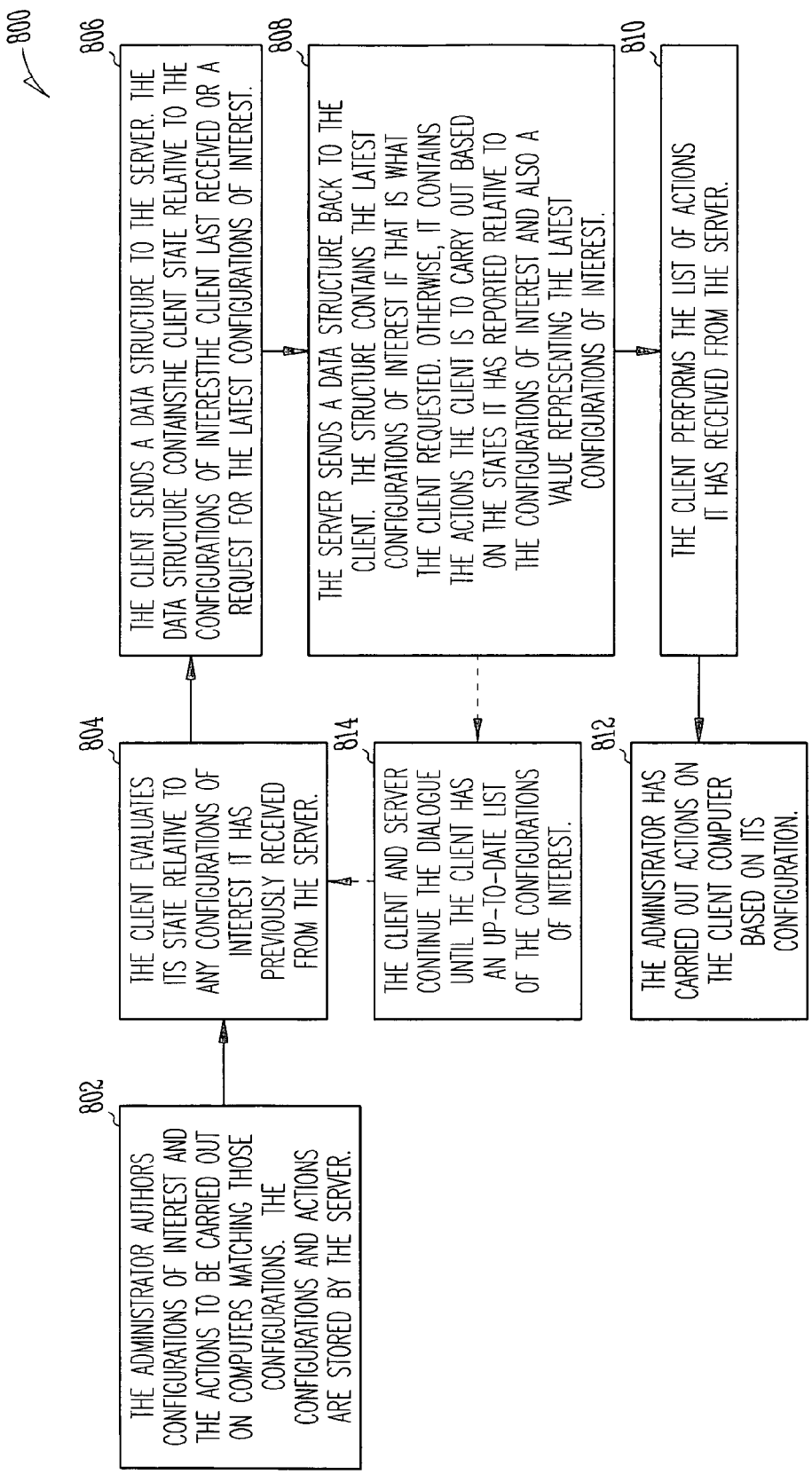
FIG. 8 is a more detailed flow chart of a method performed by a system according to an example embodiment of the invention.

Example Implementations. FIG. 8 is an example embodiment of a method 800 according to an embodiment of the present inventive subject matter. This example illustrates a network-wide embodiment of the method 800.

In this embodiment, the method 800 begins with a system administrator authoring 802 configurations of interest and actions to be carried out on computers matching those configurations. In this embodiment, the authored configurations and actions are stored by the server. A client evaluates 804 its state relative to any configurations of interest it has previously received from the server. After the evaluation, the client then sends 806 a data structure to the server. In some embodiments, the data structure contains the client state relative to the configurations of interest the client last received or a request for the latest configurations of interest. In response to the data structure received from the client, the server then sends 808 a data structure back to the client. The data structure sent 808 back to the client contains the latest configurations of interest if that is what the client requested. Otherwise, the data structure sent 808 back to the client contains the actions the client is to carry out based on the states it has reported relative to the configurations of interest and also a value representing the latest configurations of interest. This dialogue between the client and the server continues 814 until the client has an up-to-date list of the configurations of interest. Once the client has the up-to-date configurations of interest, the client performs 810 the list of actions received from the server associated with the configurations of interest. After the actions are performed by the client 812, the system administer has accomplished the desired network administration result.

Figure 9:
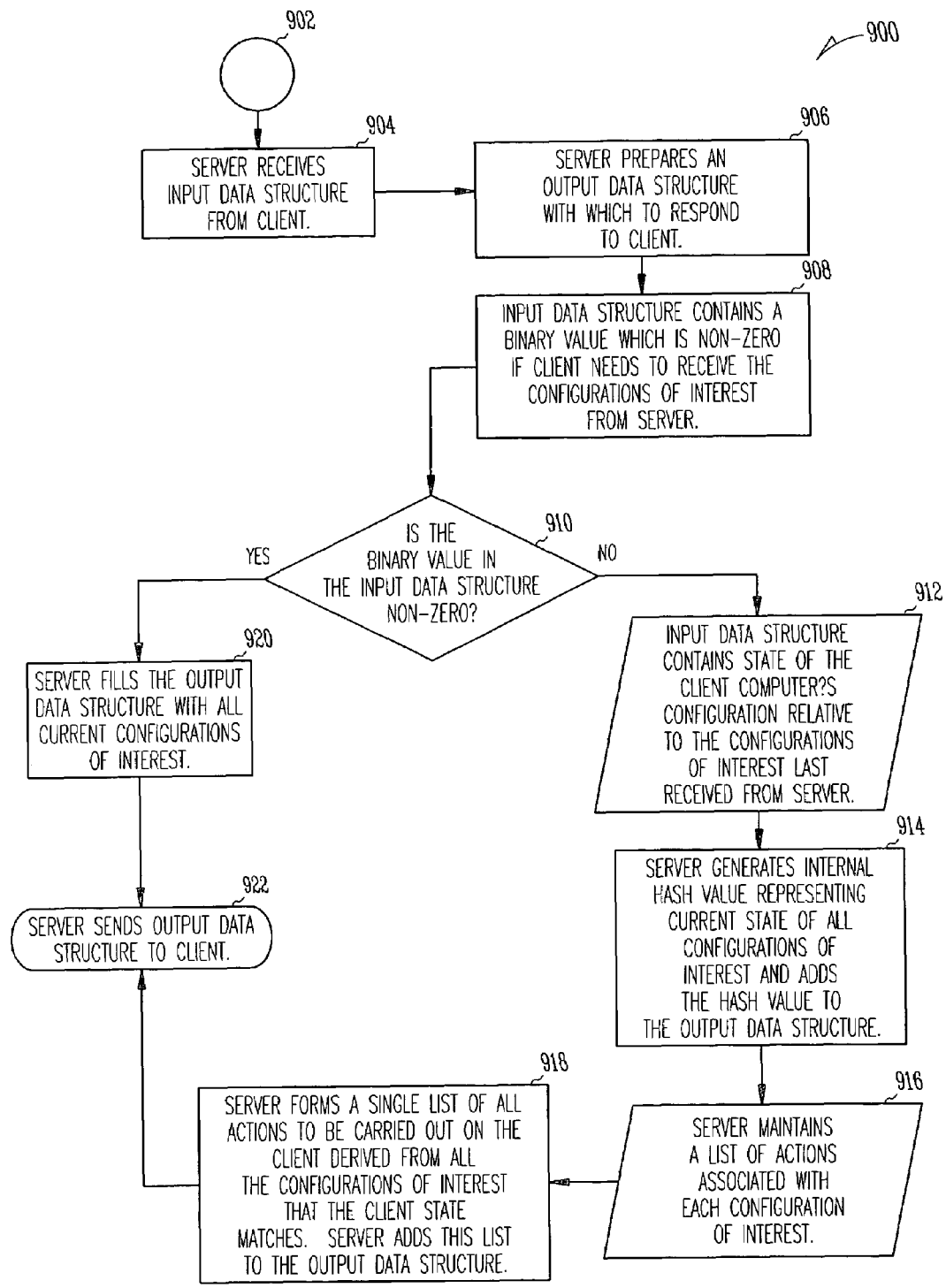
FIG. 9 is a more detailed flow chart of the methods performed by the server referred to in FIG. 1 according to an example embodiment of the invention.

FIG. 9 is another example embodiment of a method 900 according to an embodiment of the present inventive subject matter. This example illustrates a method 900 of operation for a server.

Upon initiation 902 of the method 900, the server receive 904 an input data structure 908 from a client. The server then prepares 906 an output data structure with which to respond to client. In this embodiment, the input data structure 908 contains a binary value which is non-zero if client needs to receive the configurations of interest from server. The method then determines 910 if the binary value in the input data structure is non-zero.

If the binary value in the input structure is non-zero, the server fills 920 the output data structure with all current configurations of interest for the client and sends 922 output data structure to the client. However, if the input data structure is zero, the input data structure contains 912 the state of the client computer's configuration relative to the configurations of interest last received on the client from the server. The server then generates 914 an internal value representing the current state of all configurations of interest and adds the value to the output data structure. In some embodiments, the server maintains 916 a list of actions associated with each configuration of interest from which the server forms 918 a single list of all actions to be carried out on the client. The single list of all actions to be carried on the client is derived from all of the configurations of interest that the client state matches. The server then adds this action list to the output data structure and sends 922 the output data structure to the client.

Figure 10:
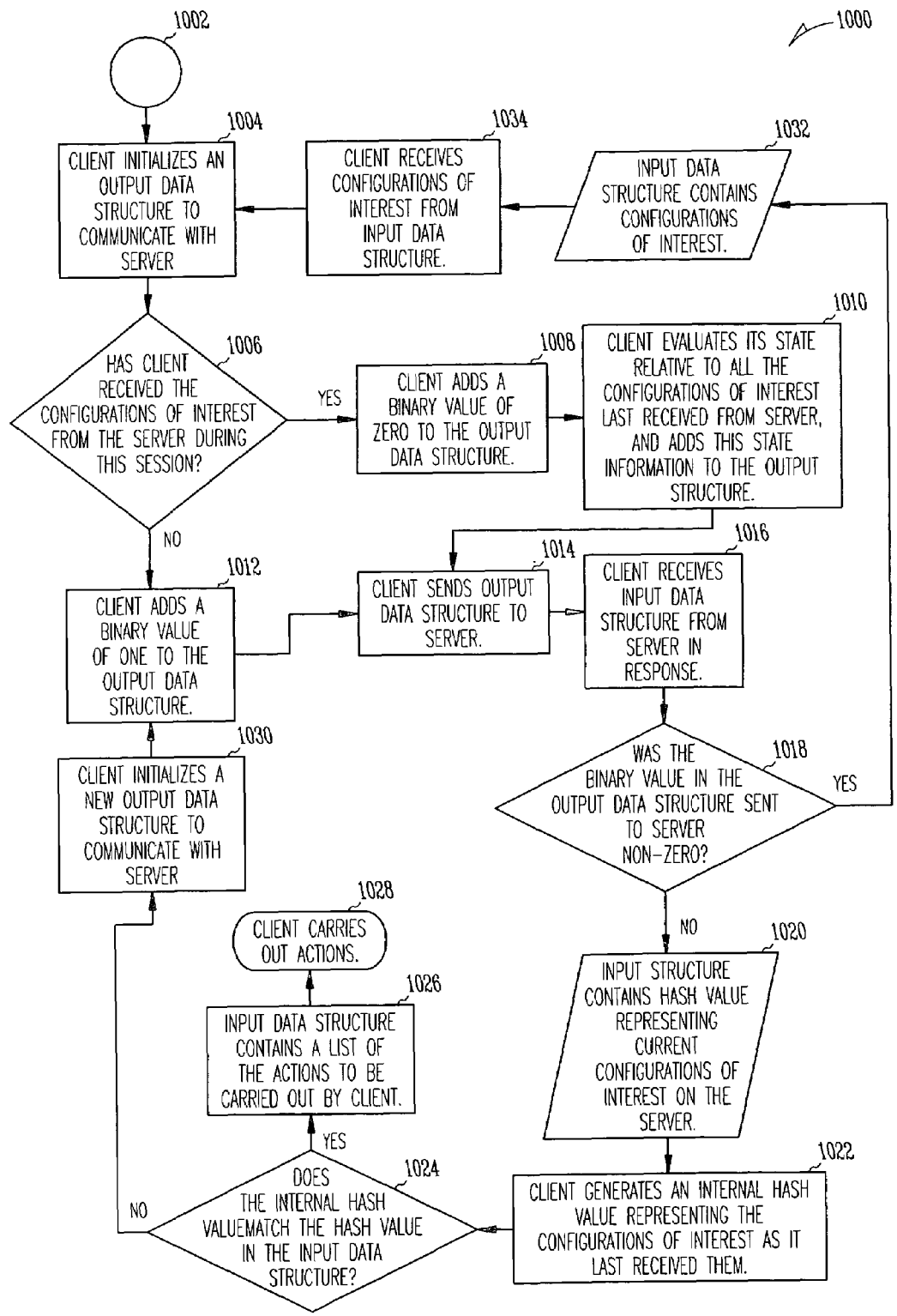
FIG. 10 is a more detailed flow chart of the methods performed by the client referred to in FIG. 1 according to an example embodiment of the invention.

FIG. 10 is yet another example embodiment of a method 1000 according to an embodiment of the present inventive subject matter. This example illustrates a method 1000 of operation for a client.

Upon initiation 1002 of the method 1000, a client initializes 1004 an output data structure to communicate with a server. In this embodiment, the client first determines 1006 if it has received configurations of interest from the server during the present session. If the client has not received configurations of interest from the server during the present session, the client adds 1012 a binary value of one to the output data structure and sends 1014 the output data structure to the server. If the client has received configurations of interest from the server during the present session, the client adds 1008 a binary value of zero to the output data structure. The client 1010 then evaluates its state relative to all configurations of interest last received from the server, and adds this state information to the output data structure. The client then sends 1014 the output data structure to the server.

The method 1000 further includes the client receiving 1016 an input data structure from the server in response to the sending 1014 of the output data structure to the server. The client then determines 1018 if the binary value in the output data structure sent to server was non-zero. If the binary value was non-zero, this is an indication 1032 that the input data structure contains configurations of interest, which the client receives 1034 and returns to initializing 1004 an output data structure at the beginning of the method and continues through the method again based on the newly received configurations of interest.

However, if the client determines 1018 the binary value in the output data structure sent to the server was zero, the input data structure 1020 received 1016 from the server contains a value representing current configurations of interest on the server. The client then generates 1022 an internal value representing the configurations of interest last received on the client and compares 1024 the value received from the server and the internal value to determine if there is a match. If there is a match 1026, the input data structure received 1016 from the server contains a list of the actions to be carried out by the client, which the client then performs 1028. However, if the comparison 1024 result is that there is not a match between the value in the input data structure received from the server and the client's internal value, the client initializes 1030 a new output data structure to communicate with server. The method 1000 then proceeds back to adding 1012 a binary value of one to the output structure and sends 1014 the output data structure to the server. The method 1000 then continues as described above.

Syntax Examples. In some embodiments, configurations of interest are defined by administrators using a scripting or programming language. The language in various embodiments of the present inventive subject matter can be a compiled, uncompiled, or scripting language.

Figure 11:
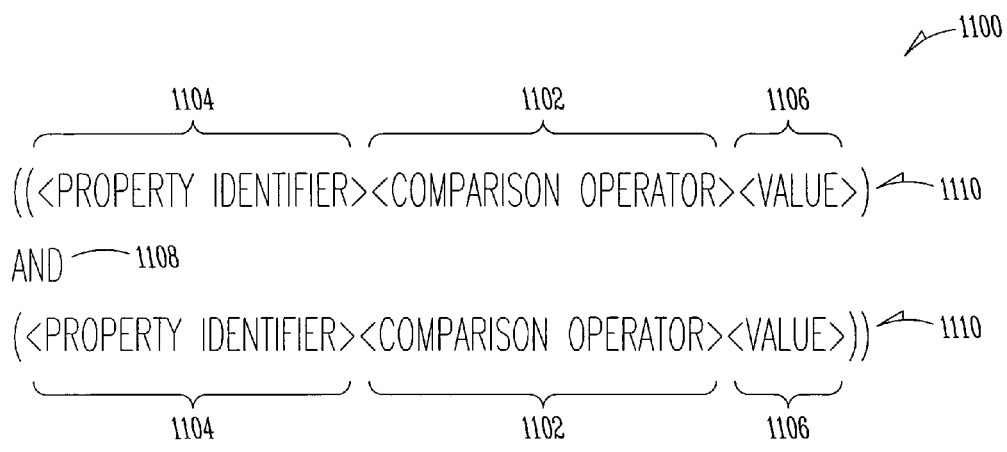
FIG. 11 is an example of a syntax for use in example embodiments of the invention.

One example embodiment includes a custom syntax as follows. This syntax is implemented by New Boundary Technologies, Inc. in its Prism family of products. This syntax is useful for defining configurations of interest and, in one embodiment, is divided into five categories:

1. Property identifiers
2. Comparison Operators
3. Logical Operators
4. Values
5. Precedence Operators Embodiments of the invention are not limited to these five categories or to any particular data structure or rules for defining configurations of interest. FIG. 11 is one example of a syntax for defining configurations of interest. However, alternate embodiments of the invention may be implemented with a different syntax.

FIG. 11 shows a generic structure 1100 to define a configuration of interest. The structure 1100 comprises one or more statements 1110 connected with one or more logical operators 1108. In the example shown in FIG. 11, each statement 1110 is comprised of a property identifier 1104, a comparison operator 1102 and a value 1106. Statements 1110 are not limited to the format shown in FIG. 11. A statement, such as statement 1110, can be any combination of property identifiers 1104, comparison operators 1102 and values 1106. In some embodiments, the structure 1100 comprises only a single statement 1110. Each of the elements of FIG. 11 will be described in more detail below.

The following is a more specific example of a statement using the New Boundary Technologies, Inc. custom syntax:

((exists <file> "c:\file.txt")
AND
(OSVersion=WinXP))

The <file> and OSVersion are property identifiers. The EXISTS and the "=" are comparison operators. The AND is a logical operator. The "c:\file.txt" and WinXP are values. These syntax elements are described in greater detail below.

1. Property identifiers. Property identifiers identify which property on the client device is of interest for the statement being evaluated. Some property identifiers according to an example embodiment are listed below; however, embodiments of the invention are not limited to these property identifiers:

Environment Variable
Pre-defined Variable
Registry Key
Registry Value
INI Value
File
File Version
Folder 2. Comparison Operators. The following are comparison operators according to an example syntax embodiment; however, embodiments of the invention are not limited to these comparison operators:

= (identity)
< > (non-identity)
< (less than)
<= (less than or equal to)
> (greater than)
>= (greater than or equal to)
EXISTS (the property identifier exists)
MATCHES (the property identifier is like the value, using DOS wildcards)
GREPMATCHES (the property identifier is like the value, using regular expressions)

Comparison operators are followed by a value.
Examples:
RAM<64 MB
SysFullLang < > "English (U.S.)"

3. Logical Operators. The following are logical operators according to an example syntax embodiment; however, embodiments of the invention are not limited to these logical operators:

AND
OR
NOT

In the absence of precedence operators (e.g., parentheses) to the contrary, logical operators are evaluated left to right.

The NOT operator merely inverts the meaning of the operator that follows it. One example might be:

NOT EXISTS <File> "C:\Oracle\DB.BIN"

4. Values. The values are the text or numeric character sequences against which the property identifiers are checked using the comparison operator provided. The following are values according to an example syntax embodiment; however, embodiments of the invention are not limited to these particular values.

Numbers

Text

Sizes

Version Numbers

5. Precedence Operators. Precedence operators such as parentheses are used to override the normal left-to-right evaluation. The precedence operators change the outcome of the evaluation in some cases, similar to the use of parentheses in mathematical equations. For example:

(CPUModel="Pentium 5" AND OSVersion="Win2K") OR (CPUModel="Pentium 4" AND OSVersion="Win95")

This custom syntax, and virtually any other programming or scripting language chosen for a specific embodiment of the present inventive subject matter provides administrators with great flexibility in defining configurations of interest. However, learning the custom syntax described above, or another language, can be difficult and is generally a lengthy process. Further, after initially defining configurations of interest, the configurations of interest may not be altered or added to for a relatively long period of time. Thus, learning and remembering the syntax of a language used in the various embodiments can be difficult. Thus, some embodiments of the present inventive subject matter provide visual assistance with the syntax.

Figure 12:
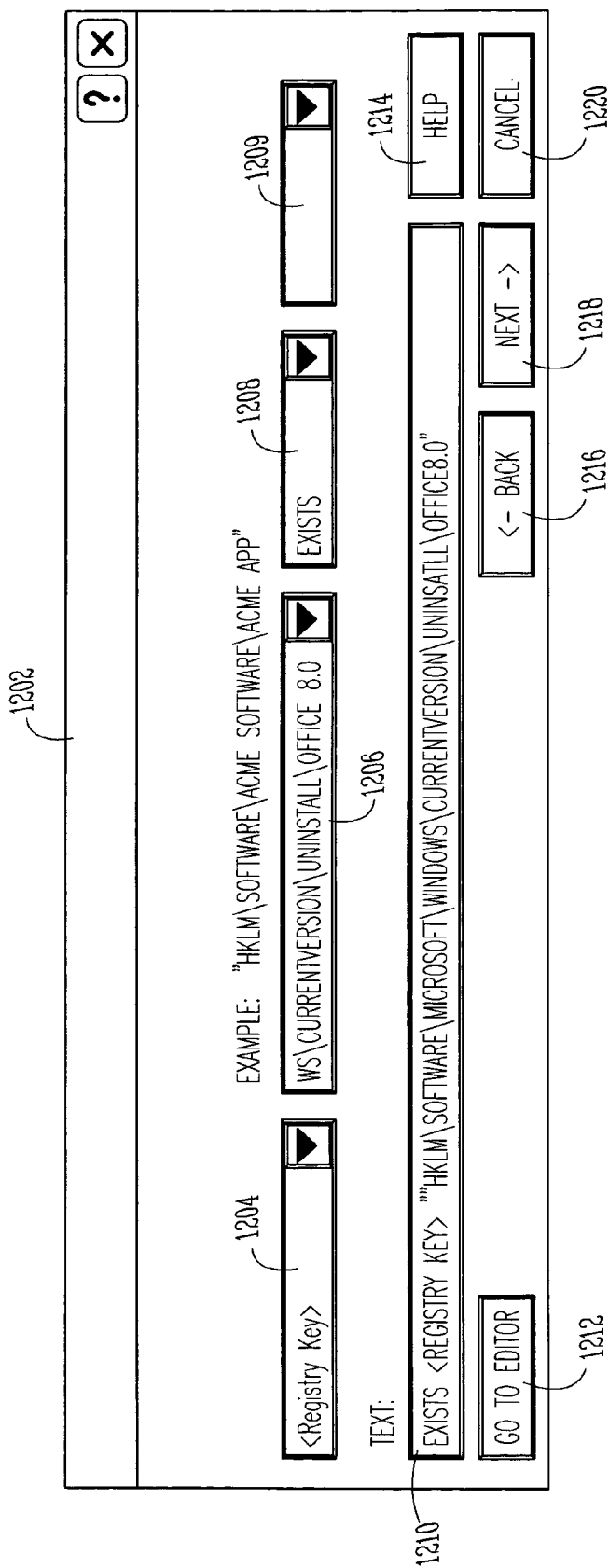
FIG. 12 is a user interface according to one embodiment of the invention.

FIG. 12 is an example of a user interface 1202 according to an embodiment of the present inventive subject matter. The user interface 1202 is useful in defining configurations of interest for storage on a server and distribution to clients.

In the example embodiment shown in FIG. 12, the user interface 1202 includes a property identifier field 1204, a value field 1206, a comparison operator field 1208, and a logical operator field 1209. The user interface further includes a text field 1210, a button to open a text editor 1212, navigation buttons 1216 and 1218, a help button 1214, and a cancel button 1220.

In this embodiment, the property identifier field 1204 is a drop down list box, that when selected provides a list of property identifier types to choose from. A chosen property identifier in the property identifier field 1204 correlates to a property on a client to be evaluated in relation to a configuration of interest created using the user interface 1202. The configuration of interest is further defined by entering text into the value field 1206. Text entered into the value field 1206 is evaluated on a client for a chosen property identifier in the property identifier field 1204. The evaluation on the client of an entered value for a chosen property identifier is performed in accordance with a comparison operator specified in the comparison operator field 1208. The comparison operator field 1208 is a drop down list box, that when selected provides a list of comparison operators to choose from. As the fields of the user interface 1202 are populated, the text field 1210 is populated with text of a statement of a configuration of interest according to the values in the fields.

Some embodiments, including the user interface 1202 of FIG. 12, allow for defining multiple statements in a configuration of interest. To create multiple statements with the user interface 1202, the logical operator field 1209 and navigation buttons 1216 and 1218 are provided. When a statement is complete, a logical operator must be chosen in the logical operator field 1209 and the next button 1218 is selected. The logical operator field 1209 is a drop down list box, that when selected provides a list of logical operators to choose from. When the next button 1218 is selected, the current configuration of interest statement is stored and the user interface 1202 is cleared to allow for entry of the next statement. Navigation from a current configuration of interest statement to a previous configuration of interest statement is performed by selecting the back button 1216. The next button 1218 can then be used in a similar fashion to navigate forward.

The button to open a text editor 1212, when selected, opens a text editor. The text editor that opens allows for text entry of a configuration of interest, bypassing the user interface. In some embodiments, if a configuration of interest, or any part thereof, has been created using the user interface 1202, that configuration of interest appears in the text editor when opened. In some embodiments, the text editor allows return to the user interface to manipulate a configuration of interest from the text editor.

In some embodiments of the user interface 1202, an administrator completes the definition of a configuration of interest by selecting the next button 1218 without choosing a logical operator in the logical operator field 1209. In other embodiments, another button is provided, such as an "OK" button (not shown).

If at any time while defining a configuration of interest with the user interface 1202 help is needed, a help button 1214 is provided. Upon selection of the help button 1214, a help screen is displayed providing information on various topics useful in manipulating the user interface 1202, the specific embodiment of the present inventive subject matter, or the syntax or language of the specific embodiment for defining configurations of interest. Further, if at anytime an administrator desires to discard or otherwise stop the defining of the configuration of interest, the cancel button 1220 can be selected.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

It will be readily understood to those skilled in the art that various other changes in the details, material, and arrangements of the parts and method stages which have been described and illustrated in order to explain the nature of this invention may be made without departing from the principles and scope of the invention as expressed in the subjoined claims.

We claim:

1. A system comprising:

a network administered by a network administrator, wherein the network includes at least one network administration server in communication with a plurality of client computers over which the network administrator has administrative responsibilities;

network administration software operative on the at least one network administration server to perform the following functions:

maintain a list of client computers over which the network administrator has administrative responsibilities;

define one or more configurations of interest, wherein the configurations of interests include a state of a configuration parameter of a client computer;

define and associate one of the configurations of interest with one or more actions to be taken, wherein the action includes at least updating software and one or more of: installing a file, overwriting a file, removing a file, adding a registry setting, changing a registry setting, removing a registry setting, and modifying an operating system file permission;

distribute data to a plurality of the client computers selected from the list of client computers, wherein the data defines at least one of the configurations of interest; and receive from each particular computer in the plurality of client computers a state of a configuration of the particular client computer relative to a configuration of interest distributed to the particular computer;

wherein, the plurality of client computers include at least one program operative on the plurality of client computers to:

receive the data defining the at least one configuration of interest;

store the at least one configuration of interest on the client computer;

repeatedly determine the state of the configuration of the client computer relative to the at least one configuration of interest;

report to the network administration server the state of the configuration of the client computer relative to the at least one configuration of interest;

repeatedly determine whether the state of the configuration of the client matches the at least one configuration of interest, and when the state of the configuration of the client matches the configuration of interest, determine whether at least one of the one or more actions to be taken associated with the at least one configuration of interest is a client-side action; and automatically perform the client-side action associated with the at least one configuration of interest;

and further wherein the network administration software is further operative on the at least one network administration server to:

receive the reported state of the configuration of the plurality of client computers relative to the respective at least one configuration of interest;

record an indication of each state of the configuration of the plurality of client computers relative to the respective configurations of interest;

determine whether the reported state of the configuration of the plurality of client computers matches at least one of the distributed configurations of interest, and when the reported state of the configuration of at least one of the plurality of client computers changes with respect to at least one of the distributed configurations of interest, determine whether at least one of the one or more actions to be taken associated with the at least one of the distributed configurations of interest is a server-side action;

automatically perform the server-side action associated with the at least one of the distributed configurations of interest; and provide at least one indication of one of the client computers with at least one of the configurations of interest.

2. The system of claim 1, wherein the at least one program operative on the plurality of client computers is further configured to:

periodically request from the network administration server at least one updated configuration of interest;

receive the at least one updated configuration of interest; and reevaluate the state of the configuration of the client computer with respect to the at least one updated configuration of interest; and report to the network administration server the state of the configuration of the client computer relative to the at least one updated configuration of interest.

3. The system of claim 1, wherein the network administration software is further operative to:

group client computers with similar configuration states in a display communicatively coupled to the network administration server; and dynamically update the display as client computers change the state of configuration with respect to a distributed configuration of interest.

4. The system of claim 1, wherein the one or more configurations of interest are defined using a logical statement including a property identifier, a value, and a comparison operator, wherein the property identifier represents a client property to be evaluated locally on a client computer, the value is what the property identifier is to be compared to, and the comparison operator is how the property is to be compared to the value.

5. A system comprising:

a network administered by a network administrator, wherein the network includes at least one network administration server in communication with a plurality of client computers over which the network administrator has administrative responsibilities;

network administration software operative on the at least one network administration server to perform the following functions:

maintain a list of client computers over which the network administrator has administrative responsibilities;

define one or more configurations of interest, wherein the configurations of interests include a state of a configuration parameter of a client computer;

define and associate one of the configurations of interest with one or more actions to be taken;

distribute data to a plurality of the client computers selected from the list of client computers, wherein the data defines at least one of the configurations of interest; and receive from each particular computer in the plurality of client computers a state of a configuration of the particular client computer relative to a configuration of interest distributed to the particular computer;

wherein, the plurality of client computers include at least one program operative on the plurality of client computers to:

receive the data defining the at least one configuration of interest;

store the at least one configuration of interest on the client computer;

repeatedly determine the state of the configuration of the client computer relative to the at least one configuration of interest;

report to the network administration server the state of the configuration of the client computer relative to the at least one configuration of interest;

repeatedly determine whether the state of the configuration of the client matches the at least one configuration of interest, and when the state of the configuration of the client matches the configuration of interest, determine whether at least one of the one or more actions to be taken associated with the at least one configuration of interest is a client-side action; and automatically perform the client-side action associated with the at least one configuration of interest;

and further wherein the network administration software is further operative on the at least one network administration server to:

receive the reported state of the configuration of the plurality of client computers relative to the respective at least one configuration of interest;

record an indication of each state of the configuration of the plurality of client computers relative to the respective configurations of interest;

determine whether the reported state of the configuration of the plurality of client computers matches at least one of the distributed configurations of interest, and when the reported state of the configuration of at least one of the plurality of client computers changes with respect to at least one of the distributed configurations of interest, determine whether at least one of the one or more actions to be taken associated with the at least one of the distributed configurations of interest is a server-side action;

automatically perform the server-side action associated with the at least one of the distributed configurations of interest; and provide at least one indication of one of the client computers with at least one of the configurations of interest.

6. The system of claim 5, wherein the at least one program operative on the plurality of client computers is further configured to:

periodically request from the network administration server at least one updated configuration of interest;

receive the at least one updated configuration of interest; and reevaluate the state of the configuration of the client computer with respect to the at least one updated configuration of interest; and report to the network administration server the state of the configuration of the client computer relative to the at least one updated configuration of interest.

7. The system of claim 5, wherein the network administration software is further operative to:

group client computers with similar configuration states in a display communicatively coupled to the network administration server; and dynamically update the display as client computers change the state of configuration with respect to a distributed configuration of interest.

8. The system of claim 5, wherein the one or more configurations of interest are defined using a logical statement including a property identifier, a value, and a comparison operator, wherein the property identifier represents a client property to be evaluated locally on a client computer, the value is what the property identifier is to be compared to, and the comparison operator is how the property is to be compared to the value.

9. The system of claim 5, wherein the actions associated with the configurations of interest include at least updating software and one or more of: installing a file, overwriting a file, removing a file, adding a registry setting, changing a registry setting, removing a registry setting, and modifying an operating system file permission.

10. A method of administering a computer network, the computer network administered by a network administrator, and the computer network including at least one network administration server in communication with a plurality of client computers over which the network administrator has administrative responsibilities, the method comprising:

at the at least one network administration server:

maintaining a list of client computers over which the network administrator has administrative responsibilities;

defining one or more configurations of interest, wherein the configurations of interests include a state of a configuration parameter of a client computer;

defining and associating one of the configurations of interest with one or more actions to be taken, wherein the action includes at least updating software and one or more of: installing a file, overwriting a file, removing a file, adding a registry setting, changing a registry setting, removing a registry setting, and modifying an operating system file permission;

distributing data to a plurality of the client computers selected from the list of client computers, wherein the data defines at least one of the configurations of interest; and receiving from each particular computer in the plurality of client computers a state of a configuration of the particular client computer relative to a configuration of interest distributed to the particular computer.

11. The method of claim 10, further comprising:

at the plurality of client computers:

receiving the data defining the at least one configuration of interest;

storing the at least one configuration of interest on the client computer;

repeatedly determining the state of the configuration of the client computer relative to the at least one configuration of interest;

reporting to the network administration server the state of the configuration of the client computer relative to the at least one configuration of interest;

repeatedly determining whether the state of the configuration of the client matches the at least one configuration of interest, and when the state of the configuration of the client matches the configuration of interest, determining whether at least one of the one or more actions to be taken associated with the at least one configuration of interest is a client-side action; and automatically performing the client-side action associated with the at least one configuration of interest.

12. The method of claim 11, further comprising:

at the at least one network administration server:

receiving the reported state of the configuration of the plurality of client computers relative to the respective at least one configuration of interest;

recording an indication of each state of the configuration of the plurality of client computers relative to the respective configurations of interest;

determining whether the reported state of the configuration of the plurality of client computers matches at least one of the distributed configurations of interest, and when the reported state of the configuration of at least one of the plurality of client computers changes with respect to at least one of the distributed configurations of interest, determining whether at least one of the one or more actions to be taken associated with the at least one of the distributed configurations of interest is a server-side action;

automatically performing the server-side action associated with the at least one of the distributed configurations of interest; and providing at least one indication of one of the client computers with at least one of the configurations of interest.

13. The method of claim 10, further comprising:

at the plurality of client computers:

periodically requesting from the network administration server at least one updated configuration of interest;

receiving the at least one updated configuration of interest; and reevaluating the state of the configuration of the client computer with respect to the at least one updated configuration of interest; and reporting to the network administration server the state of the configuration of the client computer relative to the at least one updated configuration of interest.

14. The method of claim 10, further comprising:

at the at least one network administration server:

grouping client computers with similar configuration states in a display communicatively coupled to the network administration server; and dynamically updating the display as client computers change the state of configuration with respect to a distributed configuration of interest.

15. The method of claim 10, wherein the one or more configurations of interest are defined using a logical statement including a client property, a value, and a comparison operator, and further comprising comparing the property identifier with the value using the comparison operator.

* * * * *

UNITED STATES PATENT AND TRADEMARK OFFICE
CERTIFICATE OF CORRECTION

PATENT NO. : 7,568,018 B1  Page 1 of 1
APPLICATION NO. : 10/805173
DATED : July 28, 2009
INVENTOR(S) : Hove et al.

It is certified that error appears in the above-identified patent and that said Letters Patent is hereby corrected as shown below:

Title Page; item (56); On Page 2, under "Other Publications", in column 2, line 5, before "Second" delete "0".

On Sheet 6 of 10, in Fig. 8 (Reference Box. 806), line 2, delete "CONTAINSTHE" and insert -- CONTAINS THE --, therefor.

On Sheet 6 of 10, in Fig. 8 (Reference Box. 806), line 3, delete "INTERESTTHE" and insert -- INTEREST THE --, therefor.

On Sheet 7 of 10, in Fig. 9 (Reference Box. 912), line 3, delete "COMPUTER?S" and insert -- COMPUTER'S --, therefor.

On Sheet 10 of 10, in Fig. 12 (Reference Box. 1210), line 1, delete "UNINSATLL" and insert -- UNINSTALL --, therefor.

Signed and Sealed this

Second Day of February, 2010

David J. Kappos
*Director of the United States Patent and Trademark Office*